United States Patent [19]

Apsley

[11] Patent Number: 4,790,635

[45] Date of Patent: Dec. 13, 1988

[54] ELECTRO-OPTICAL DEVICE

[75] Inventor: Norman Apsley, Malvern, England

[73] Assignee: The Secretary of State for Defence in Her Majesty's Government of the United Kingdom of Great Britain and Northern Ireland, London, England

[21] Appl. No.: 42,342

[22] Filed: Apr. 24, 1987

[30] Foreign Application Priority Data

Apr. 25, 1986 [GB] United Kingdom ............... 8610129

[51] Int. Cl.$^4$ .................. G02F 1/01; H01L 27/14; H01L 31/00
[52] U.S. Cl. .................... 350/356; 350/355; 357/30
[58] Field of Search ............ 350/355, 356, 354, 164, 350/166; 332/7.51; 357/30 B, 30 E, 30 L

[56] References Cited

U.S. PATENT DOCUMENTS

| | | | |
|---|---|---|---|
| 3,699,347 | 10/1972 | Buchan et al. | 350/336 |
| 4,032,773 | 6/1977 | Koda | 350/333 |
| 4,158,133 | 6/1979 | Spaeth et al. | 350/166 |
| 4,568,140 | 2/1986 | Van der Worf et al. | 350/166 |
| 4,701,030 | 10/1987 | Jewell | 350/354 |

FOREIGN PATENT DOCUMENTS 0012439 6/1988 European Pat. Off. ............ 350/355

Primary Examiner—Eugene R. LaRoche
Assistant Examiner—Nathan W. McCutcheon
Attorney, Agent, or Firm—Nixon & Vanderhye

[57] ABSTRACT

An electro-optical device is arranged as a Fabry Perot etalon comprising two mirrors and a central region. The mirrors are multilayer heterostructures of $Al_xGa_{1-x}As$ semiconductor materials where x alternates between 1.0 and 0.3. The central region may be a multiple quantum well structure of $Al_xGa_{1-x}As$ where x alternates between 0 and 0.3. The etalon material doping is non-uniform so that it is electrically a semiconductor device with a biasable central region. The optical path length in the central region is electric field dependent, and the etalon transmission or reflection is accordingly modulatable by varying the central region bias. The mirrors may be heavily doped and of opposite conductivity type with the central region undoped. This provides a PIN diode. Light incident on the etalon executes multiple transits of the central region. It is therefore unnecessary to employ long path lengths and high fields to enhance weak electro-optical effects in order to produce significant modulation, this being necessary in prior art devices.

12 Claims, 5 Drawing Sheets

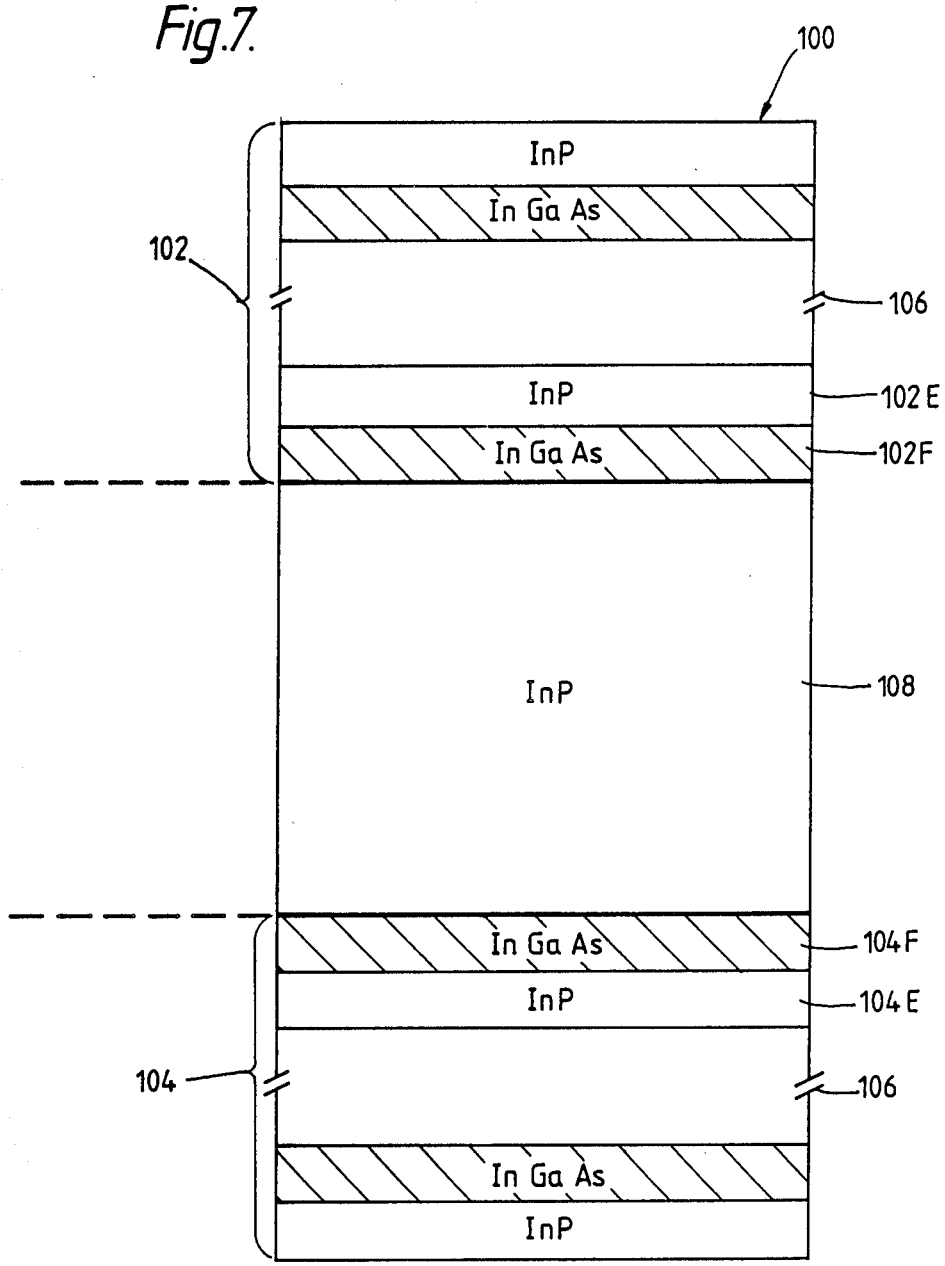

ELECTRO-OPTICAL DEVICE

This invention relates to an electro-optical device.

Electro-optical devices are well known in the prior art, and embrace electro-optical modulators, photon detectors, thermal (temperature-responsive) detectors, and photo-emitters. Electrooptical modulators in particular are in a variety of forms. They may incorporate materials which have some optical property which varies with applied electric field. The electric field dependent property may be birefringence, absorption or refractive index. Those that rely on molecular realignment to produce optical property changes under applied field are slow and restricted to operating frequencies below 1 MHz. Modulators incorporating piezoelectric materials such as lithium niobate have very broad band non-linearities and exhibit low sensitivity to electric field. They consequently require excessive size and/or control voltage.

Modulators incorporating semiconductor materials have been developed which make use of the electric field dependence of the optical absorption coefficient near a large or resonance transition. The transition may be that at the minimum energy band gap or in quantum well structures the first confined hole to electron transition. In Electronics Letters, July 19, 1984, Vol. 20, No. 15, Dutton and Olson describe light modulation by Franz Keldysh effect electro-absorption in a InGaAsP-InP double heterostructure. The device consists of a dielectric optical waveguide consisting of a combination of n-InP, undoped InGaAsP and p-InP layers, which also provides a PIN diode. Reverse biasing the diode results in a high electric field on the undoped I (intrinsic) region of InGaAsP. However, since the electro-absorption effect is weak, the waveguide needs to be relatively long (380 $\mu$m) to achieve significant absorption. Moreover, to achieve a high electric field at reasonable voltage the waveguide must be narrow (0.2 $\mu$m). Both of these requirements increase modulator input capacitance, which sets an upper limit to device modulation frequency.

In Applied Physics Letters, Vol. 44, No. 1, Jan. 1, 1984, pages 16–18, Wood et al described a PIN diode structure in which the I or undoped region is a multiple quantum well structure of 100 layers. The I region comprises fifty 9.5 nm thick GaAs layers alternating with fifty 9.8 nm thick AlGaAs. This large number of fifty quantum wells is necessary to achieve appreciable modulation by varying the diode reverse bias. Electroabsorption in quantum wells by the quantum-confined Stark effect is stronger than the Franz-Keldysh effect, but large numbers of wells are required which increases processing complexity and cost. Moreover, the wood et al device has a significant capacitance of 20 pF, which is far too high for operation at microwave frequencies.

The prior art demonstrates the basic difficulty of designing high frequency electro-optical devices, this being that the electrical and optical design requirements conflict.

It is an object of the present invention to provide an alternative form of electro-optical device.

The present invention provides an electro-optical device arranged as a Fabry Perot etalon having a central region between two mirrors, the etalon being a heterostructure of different semiconductor material layers with non-uniform doping as appropriate to provide an active semiconductor device in which the central region is biasable.

The invention provides a device which is optically a Fabry Perot etalon but electrically a semiconductor device. Light reflected between the etalon mirrors executes multiple transits through the central region producing corresponding amplification of the central region optical properties. This greatly enhances weak electrooptical effects in the central region without the need for recourse to long path lengths, narrow active regions, high electric fields or excessive numbers of quantum wells as in the prior art. The invention relaxes the prior art operating speed constraints arising from conflict between electrical and optical design requirements. This makes it possible to design a family of electro-optical devices with low capacitance and hence very high operating speed.

The central region optical path length is preferably arranged to be electric field dependent at a reflection wavelength of the mirrors.

In one embodiment, the etalon is constructed of $Al_xGa_{1-x}As$ semiconductor materials having different values of the compositional parameter x. Each mirror may consist of alternately arranged layers of two materials of this system, the compositional parameter varying between two values such as 1.0 and 0.3 for example. The central region may be a quantum well structure in which one or more quantum well layers alternate with barrier layers, and may also comprise two materials of the $Al_xGa_{1-x}As$ system. The quantum well exciton energy is arranged to provide a central region refractive index peak at or near an optical wavelength for which the etalon is selectively transmissive or reflective. The total optical thickness of the central region quantum well structure is equal to half this wavelength multiplied by an integer. The two mirrors are doped strongly p-type and n-type, and the central region is undoped. This provides a PIN semiconductor diode. Under reverse bias the electric field in the diode central region changes the quantum well exciton energy and hence also the refractive index. The wavelength transmitted or reflected by the etalon when biased accordingly differs from that in the absence of bias. Monochromatic light such as a laser beam of appropriate wavelength incident on the diode becomes amplitude modulated after reflection or transmission in accordance with bias voltage variation. The diode etalon therefore provides an optical modulator. It is capable of very high speed operation since it may be constructed in a very low capacitance form. Since the modulator does not relay on optical absorption, for its effect, its optical power handling capacity is not restricted by internal heating in the absorbing state, the latter being a problem in prior art modulators. Far fewer quantum wells are required in the central region than in equivalent prior art devices because of the multiple optical transits.

The central region may alternatively comprise a single layer of semiconductor material having a band gap equal or close to the photon energy of the etalon transmission or reflection wavelength. By virtue of the well-known Franz-Keldysh effect the band edge energy controlling the refractive index is variable by applied electric field, and the device operates similarly to the embodiment previously outlined.

The invention may be arranged as a light valve, a spatial modulator of light. In this embodiment the invention comprises a plurality of diodes as previously indicated, each providing a pixel of a two dimensional pixel array. Each pixel is surmounted by a respective photoconductive layer for exposure to radiation such as that from an infra-red scene. Bias voltage is applied across each diode and photoconductive layer in series. Radiation falling on any photoconductive layer reduces its resistance and increases the corresponding central region electric field. Variation in central region electric field between pixels produces a corresponding variation in light intensity transmitted by etalon pixels. This embodiment accordingly achieves the light valve function of transforming a spatial variation in radiation intensity from one wavelength interval to another. Furthermore, this embodiment may be arranged to be sensitive to scene contrast but not scene background, this being an important requirement in infra-red imaging which is very difficult to satisfy.

The PIN diode embodiment of the invention may be used to modulate light passing from a laser diode to a avalanche photodiode detector. This combination of devices provides what may be termed an optical transistor, ie a device receiving an electrical input in the form of a reverse bias voltage to the PIN diode and providing an electrical output from the detector, but in which the equivalent of device current is a light beam. The optical transistor of the invention is potentially capable of much higher frequency operation than field effect or bipolar transistors since input capacitance can be designed to be much lower. It may also be designed to amplify, and avoids power dissipation in the PIN diode region which can give difficulties in equivalent regions of conventional devices.

The invention may also provide a phototransistor. This embodiment is optically equivalent to those indicated earlier; both mirrors are similarly doped, and the central region is arranged as a heterojunction bipolar transistor which absorbs the selective transmission or reflection wavelength of the etalon. Multiple transit of incident light through the central region multiplies the effective absorption length and increases the probability of photon absorption. The phototransistor is potentially capable of much higher speed operation than conventional equivalents.

The invention may also provide an imaging device responsive to temperature change as opposed to photon absorption. The imaging device incorporates a two dimensional array of pixels each of which is a PIN diode similar to those previously indicated. The etalon mirrors are however arranged for high finesse to produce a sharply defined wavelength selectivity. The refractive index of the central region is sufficiently temperature dependent for a change in temperature to give rise to a change in transmission or reflection of the etalon. Radiation at for example microwave or infra-red wavelengths is absorbed in a respective absorbing layer in contact with each pixel. Each pixel response corresponds to the temperature change in the respective adjacent absorbing layer. This embodiment accordingly provides an image in narrow band light of the radiant scene.

In order that the invention might be more fully understood, embodiments of the invention will now be described with reference to the accompanying drawings, in which.

Figure 3:
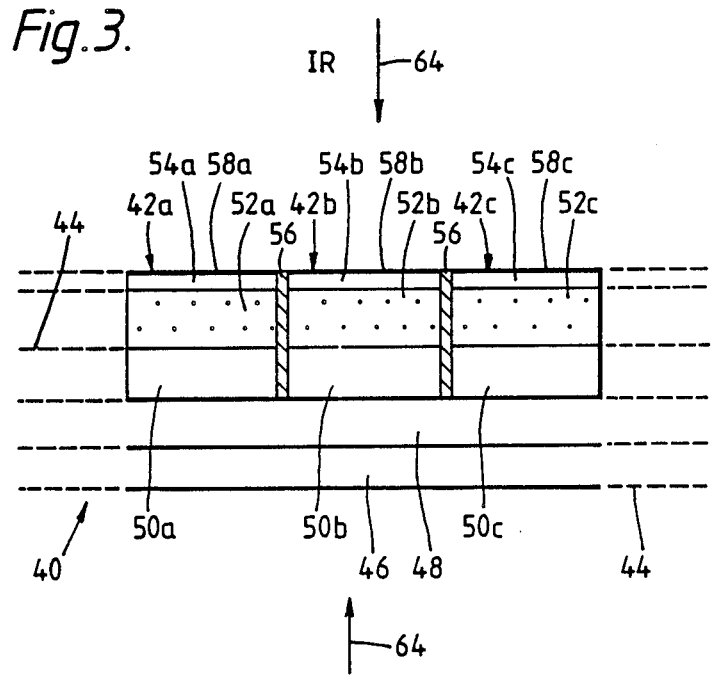
Figure 4:
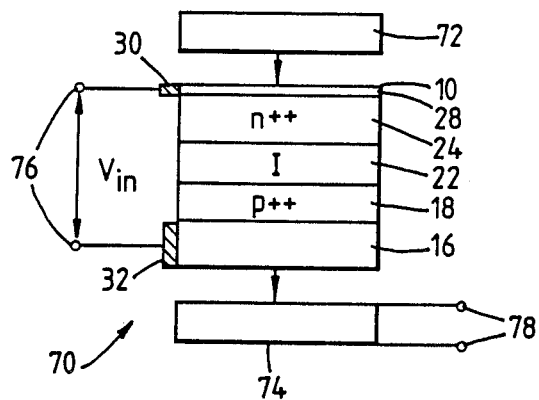
Figure 5:
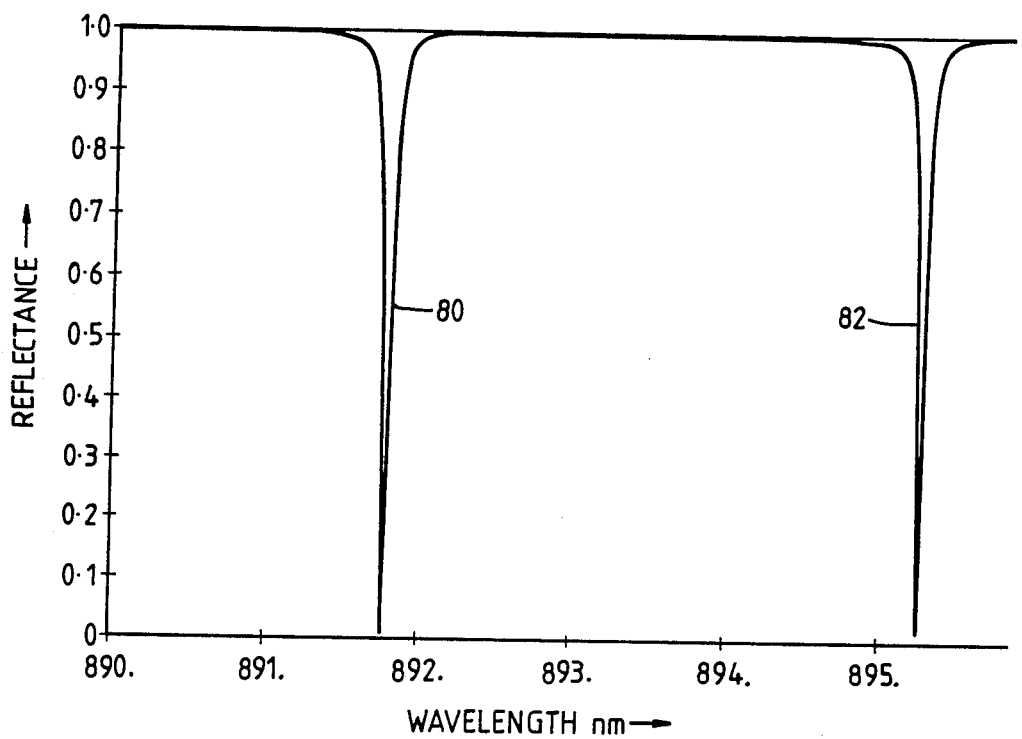
Figure 6:
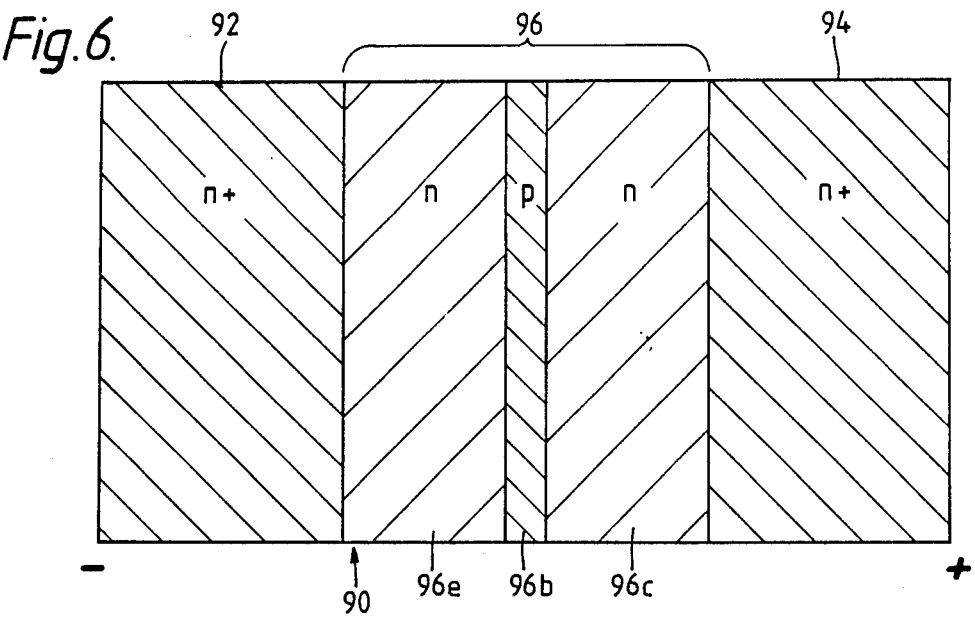
Figure 8:
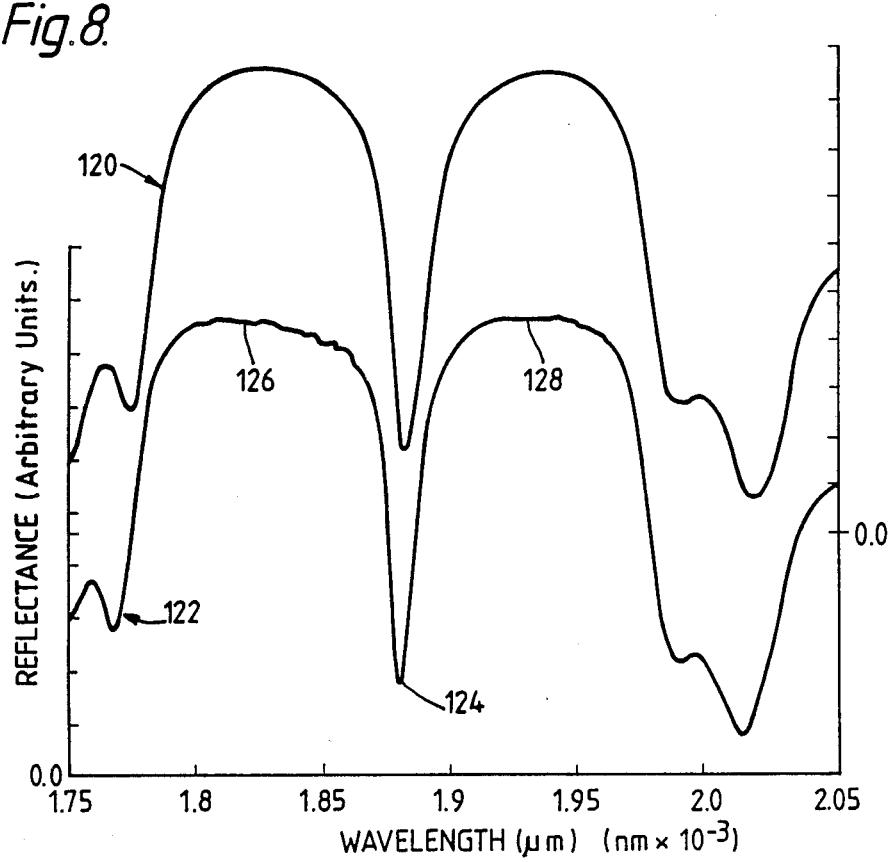

FIG. 3 schematically illustrates a light valve embodiment of the invention;

FIG. 4 schematically illustrates an optical transistor embodiment of the invention;

FIG. 5 is a graphical illustration of theoretical mirror reflectivity for a thirty-two layer structure in a thermal imaging device of the invention;

FIG. 6 schematically shows a phototransistor embodiment of the invention;

FIG. 7 is a schematic drawing of a Fabry Perot etalon of semiconductor heterostructure multilayer form; and FIG. 8 shows theoretical and experimental graphs of reflectance versus wavelength for the FIG. 7 device.

Figure 1:
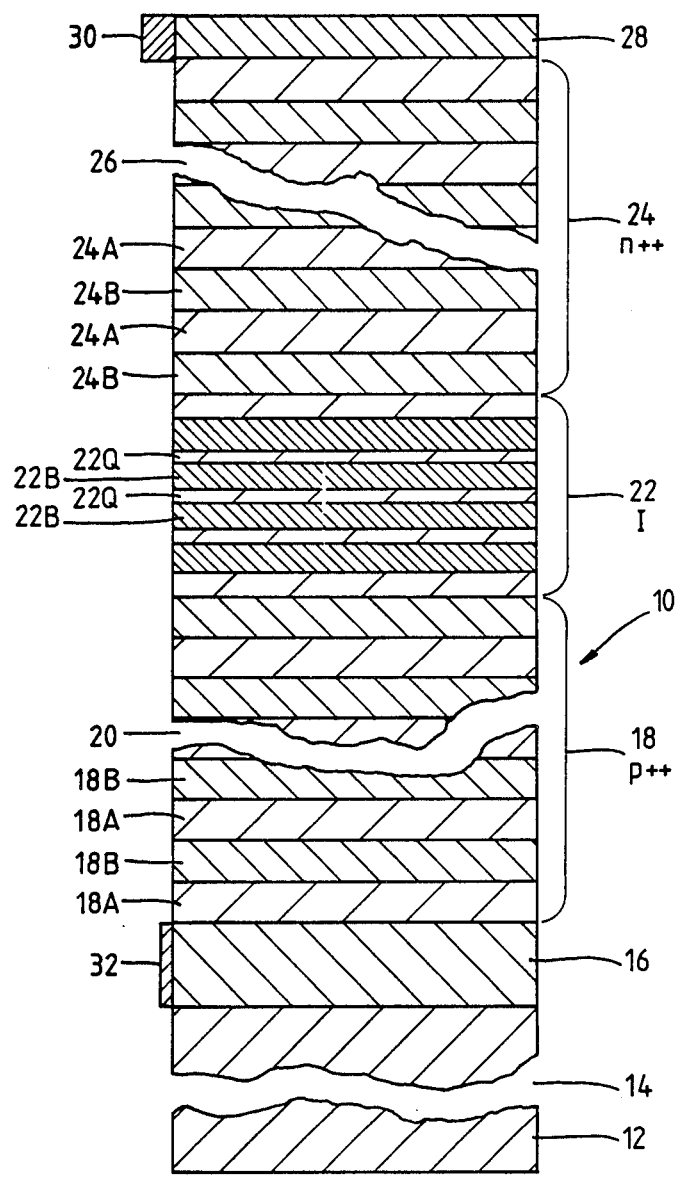
FIG. 1 is a discontinuous sectional view (not to scale) of an electro-optical modulator of the invention.

Referring to FIG. 1, there is schematically shown an electrooptical device 10 of the invention arranged as an optical modulator (not drawn to scale). The modulator 10 comprises a p type GaAs substrate 12 drawn with a discontinuous region 14 indicating much greater thickness than that illustrated. The substrate 12 bears an AlAs etch stop layer 16 one micron in thickness surmounted by a first dielectric mirror 18, the latter including a discontinuity 20 indicating greater thickness than that illustrated. The mirror 18 comprises sixteen layers (not all illustrated) of $Al_xGa_{1-x}As$ in which the compositional parameter x (and hence also the refractive index) alternates between two values in adjacent pairs of layers 18A and 18B. In the present example, each layer 18A is of AlAs (material A) and each layer 18B is of $Al_{0.3}Ga_{0.7}As$ (material B); ie x=1 and 0.3 respectively.

The mirror layers 18A and 18B are 76nm and 61 nm respectively in thickness. They are both quarter wave layers for light with a wavelength of 850 nm in free space, having refractive indices 2.80 (material A) and 3.48 (material B) at this wavelength. They have Be impurity concentrations of $5 \times 10^{17}$ cm$^{-3}$ to provide heavily doped p type or p++ material. Doping in the range $10^{17}$ to $10^{18}$cm$^{-3}$ or above would be suitable.

The first mirror 18 is adjacent a central modulator region 22 comprising twenty one quantum well (QW) layers 22Q interleaved with twenty barrier layers 22B, only five layers 22Q and four layers 22B being illustrated for reasons of clarity. The QW and barrier layers 22Q and 22B are of intrinsic GaAs and $Al_{0.3}Ga_{0.7}As$, ie $Al_xGa_{1-x}As$ with x=0 and 0.3 (materials Q and B), and are 10 nm and 20 nm in thickness respectively. The central region 22 is 610 nm in thickness, this being five half wavelengths for light having a free space wavelength of 850 nm for a refractive index of 3.48.

A second dielectric mirror 24 is adjacent to the central region 22, and comprises sixteen alternately arranged layers 24A and 24B (not all shown) of materials A and B and thicknesses 76 nm and 61 nm respectively. A discontinuity 26 indicates that mirror 24 has more layers than are illustrated. The layers 24A and 24B contain $5 \times 10^{17}$ cm$^{-3}$ Si impurity concentrations as appropriate to heavily doped n-type or n++ material. The second mirror 24 is identical to the first mirror 18 except that the layer material order is ABAB ... instead of BABA ... and the doping is of opposite conductivity type.

A capping layer 28 of heavily doped GaAs 100 nm in thickness covers the second mirror 24 to avoid oxidation of Al bearing compounds. The modulator 10 has electrical contacts 30 and 32 on the capping layer 28 and etch stop layer 16. It may be grown by the well-known techniques of molecular beam epitaxy (MBE) or metalorganic chemical vapour deposition (MOCVD). It is important that the mirror and central region layers have surfaces which are as smooth and accurately parallel as possible for reasons to be described.

The modulator 10 operates as follows. The substrate 12 is removed by etching down to the etch stop layer 16 by known means, the substrate and etch stop layer being respectively opaque and transparent at the 850 nm wavelength. The mirrors 18 and 24, formed by quarter wave dielectric layer stacks, are arranged in a face to face configuration by virtue of the relative order reversal of their component layers 18A/18B and 24A/24B. The mirrors are separated by the central region 22, which acts as a dielectric spacer. The classical optical properties of the modulator 10 are those of a Fabry-Perot etalon. Electrically however its properties are those of a pin diode formed by regions 24, 22 and 18 respectively. The diode is reverse biased by raising the potential of contact 30 with respect to contact 23. This produces a high electric field in the central region 22 of intrinsic conductivity. Very little of the applied bias potential appears across the mirrors 18 and 24 because they are heavily doped and highly conducting.

The Fabry-Perot etalon defined by the mirrors 18 and 24 and central region 22 is designed in the absence of bias voltage on contacts 30 and 32 to transmit light at a wavelength of 840 nm, and to reflect other wavelengths within the wavelength band for which the mirrors are reflecting. As is well known, a dielectric stack mirror of alternating refractive index only reflects in a wavelength band. The QW layers 22Q have a first confined hole to electron transition which is an energy of about 1.55 eV, equal to the photon energy at the 850 nm Fabry-Perot transmission wavelength.

The transmission wavelength of the modulator 10 is determined by the refractive index of the central region 22, provided of course that the mirrors of 18 and 24 are reflecting at this wavelength. This is because the refractive index of the central region 22 determines the optical path length and phase difference between successive reflections from one mirror reaching the other. The condition for constructive interference and therefore transmission is that the path difference be an integral number of wavelengths, and wavelength in a material is inversely proportional to the material's refractive index. This is of course well known in optics. However, the real part of the refractive index of any semiconductor material at or near a resonance or absorption band varies with applied electric field. The electric field dependence is a very weak effect, the obtainable variation in refractive index being less than 1% for practical values of electric field. However, since the central region 22 is within a Fabry Perot etalon, even a small change in its refractive index is sufficient to move the etalon's transmission wavelength. Accordingly, varying the reverse bias voltage applied across electrical contacts 30 and 32 varies the electric field in central region 22 and hence also its refractive index. This alters the Fabry-Perot transmission wavelength. If the modulator 10 is illuminated with monochromatic light of the zero bias transmission wavelength, applying a bias voltage reduces the transmitted intensity and electrical modulation of light intensity is achieved.

Figure 2:
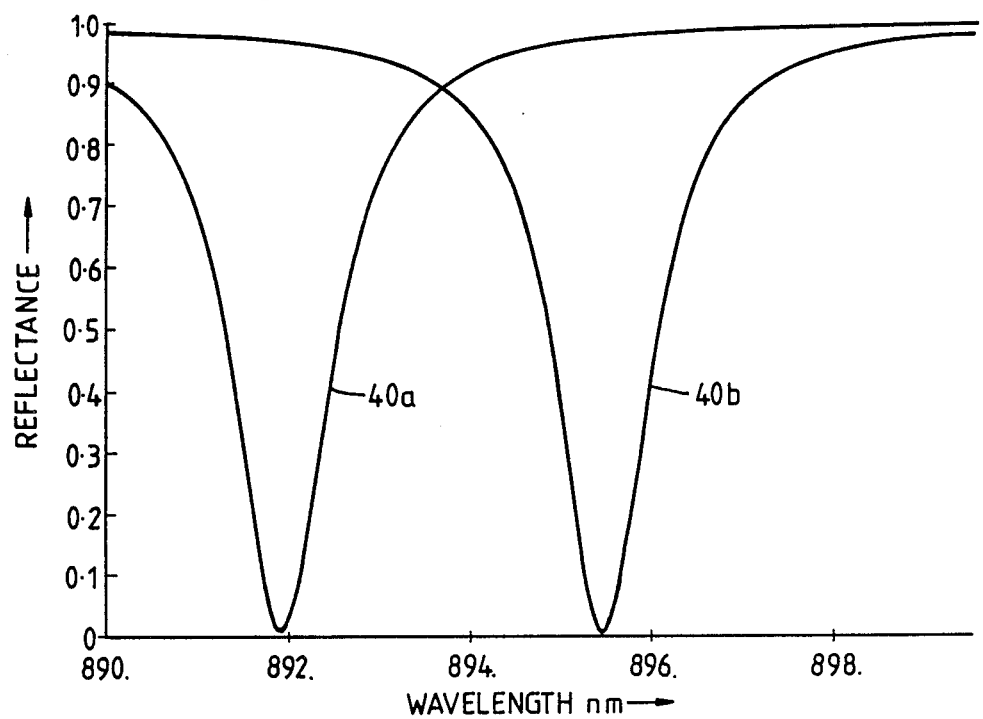
FIG. 2 is a graphical illustration of theoretical mirror reflectivity for a sixteen layer structure in the FIG. 1 device.

Referring now to FIG. 2, there is shown a graphical illustration of the effect of varying the refractive index of the central region of a Fabry-Perot etalon. FIG. 2 show two plots 40a and 40b of etalon reflectance against wavelength in nm, reflectance being plotted on a scale of 0 to 1.0 equivalent to 0 to 100%. The graphs were calculated for idealised structures similar to the FIG. 1 modulator form, in which the equivalents of central region 22 were single layers of semiconductor material with refractive indices 3.58 and 3.55 differing by 1% for wavelengths in the range 892–896 nm. The graphs 40a and 40b have reflectance minima (corresponding to transmission maxima) at about 892 nm and 895.5 nm, the minima both being virtually zero reflectance. Graph 40b has a value of about 0.97 at the wavelength of the graph 40a reflectance minimum. Accordingly, a change in 1% in the central region refractive index theoretically produces a 97% change in transmitted or reflected intensity at 892 nm. In a practical embodiment of the modulator 10, the modulation depth will be somewhat less than this because of departures of layer surfaces from parallelism and smoothness. Transmission bands can be reduced in width by increasing the number of dielectric layers per mirror, which improves mirror finesse. This is well known in optics.

The change in central region refractive index with electric field arises as follows. As has been said, the central region 22 comprises comparatively thin (10 nm) QW layers 22Q interspersed with comparatively wide (20 nm) barrier layers 22B the barrier layers being of wider band gap material. The optical properties of quantum well structures are well known for the purposes of the present invention. In particular, the quantum well gives rise to optical absorption with the creation of an exciton at a higher energy than would occur in a much thicker layer of the same material. The exciton energy is less than the barrier material (B) bandgap but more than the QW bandgap, and it can be varied merely by varying the QW layer thickness. Moreover, the exciton energy is dependent on electric field, this being known as the quantum confined Stark effect.

The exiton resonance and corresponding optical absorption is associated with sharp structure in the refractive index which changes its position with respect to wavelength as the exciton energy changes. By appropriate choice of QW layer thickness, the materials of the QW and barrier layers 22Q and 22B, and the mirrors 18 and 24, the modulator 10 is arranged to have a transmission wavelength at or near the refractive index peak of the central region 22. Ideally, the etalon resonance wavelength should be within 5 and preferably within 3 exciton line widths (at half height) of the main excitonic feature. This is within 50 meV and 30 meV respectively for GaAs. Absorption effects decrease with distance in energy from the main feature. Since, as has been said, the exciton energy is variable by an electric field the central region refractive index and Fabry-Perot transmission wavelength are also electrically variable. By virtue of the characteristic wavelength selectivity of a Fabry-Perot etalon, large modulation depths are achievable.

Some prior art modulators rely on electro-absorption effects. The variation in optical absorption of a semiconductor device with applied electric field is employed to provide light modulation. Electro-absorption is a comparatively weak effect, and so long absorption path lengths are usually required. Furthermore, since absorption is involved the modulator may need to tolerate elevated temperatures is employed with a high power laser beam. The FIG. 1 embodiment of the present invention does not suffer from these disadvantages to the same extent. The electric field variation of the real part of the refractive index is exploited, in addition to that of the imaginary part, rather than only the latter used in the prior art. Moreover, the thickness of the modulator 10 is not limited by absorption length constraints. Use of semiconductor ternary and/or binary compounds such as the $Al_xGa_{1-x}As$ system gives considerable freedom in modulator design. Whereas the modulator 10 has been described in terms of a central region 22 incorporating quantum wells, it may also incorporate a central region composed of a single semiconductor material. The material is selected to have a band gap Eg equal to close to $hc/\lambda$, where h is Planck's constant, c is the velocity of light and $\lambda$ is the transmission wavelength at zero bias. Eg may have any value up to the lowest energy gap of the mirror materials. In this example, the modulator employs the well-known Franz-Keldysh effect of band gap energy and hence refractive index varying with electric field near the band edge. In other respects this form of modulator is equivalent to FIG. 1. It provides a lesser degree of design freedom than the FIG. 1 arrangement, since the band gap of the central region material is largely determined by the required transmission wavelength. In the FIG. 1 arrangement both the semiconductor material and the quantum well geometry can be varied in the central region.

The modulator 10 may be employed to impose an amplitude modulation on laser light having the transmission wavelength, or having a wavelength transmittable by the central region 22 at some convenient applied bias voltage.

If the laser light has the transmission wavelength, the modulator 10 is an electro-optic switch switching from transparent to opaque when reverse biased. If the laser light has a wavelength which the modulator 10 transmits at a bias voltage $V_B$, then applying a bias signal $V_B + V_o \sin 2\pi ft$ ($V_o < V_B$) imposes amplitude modulation on the laser beam at twice the frequency f. The modulator operates in transmission most efficiently with the substrate 12 removed as previously described. Substrate removal would not be necessary if a transparent substrate were to be employed. A modulator could also be constructed to operate in a reflecting mode; ie it would transmit all but light of a selected frequency having energy near or equal to the energy gap or at an exciton resonance of the central region. The principles of designing reflection mode Fabry Perot etalons are well known, and this embodiment will not be described in detail.

The modulator 10 is constructed as a PIN diode since such devices are inherently capable of very high frequency operation. Provided that well known anti-parasitic designs are employed, operation at up to 100 GHz is feasible. The attainment of such frequencies is of great significance for optical fibre communication systems.

As has been said, the central region 22 is five half wavelengths in thickness at the transmission wavelength. More generally, it may be any integral number of half transmission wavelengths in thickness. Increasing the thickness increases the bias voltage required to produce a given electric field in the central region, with reduction in degree of modulation per unit bias voltage change. Against this, more quantum wells can be incorporated in a thicker central region, which increases sensitivity. Furthermore, increasing the central region thickness increases the number of etalong resonances found in a given spectral band. This may be exploited to ease device growth constraints. For example, a central region thickness of 7 μm produces etalon reflectance minima or dips at about 20 meV intervals. This is the displacement of the quantum well excitons in fields of $\sim 10^5$ V/cm. Small errors in device growth may accordingly be accommodated by a change in bias.

Referring now to FIG. 3, which is not to scale, there is shown a sectional view of part of an embodiment of the invention arranged to form a light valve or spatial modulator of light. It is indicated generally by reference 40, and has three pixels 42a, 42b and 42c illustrated schematically. Other pixels in the same line are indicated by chain lines such as 44. The light valve 40 comprises a two dimensional pixel array (not shown), ie a plurality of the pixel lines shown. In the following description, reference to a pixel 42 or other feature without a suffix a, b or c indicates any of the three pixels or their components.

The light valve 40 comprises a transparent substrate 46 bearing a p++ first mirror layer 48 common to all pixels 42. Three mutually spaced central regions 50a, 50b and 50c, one for each pixel 42, are disposed on the mirror layer 48, and are of undoped semiconductor material. Each region 50 is a combination of quantum wells and barrier layers (now shown) equivalent to region 22 in FIG. 1. A respective n++ second mirror layer 52a, 52b or 52c is disposed on each of the central regions 50. Each of the second mirror layers 52 bears a respective infra-red sensitive photoconductive layer 54a, 54b or 54c. Spaces between adjacent pixels are filled with polyimide material 56 which is both opaque and electrically insulating. Electrical bias contacts 58a, 58b and 58c are arranged on respective photoconductive layers 56, and a further contact (not shown) is arranged on the p++ mirror layer 48.

The first and second mirror layers 48 and 52 are constructed similarly to corresponding parts 18 and 24 of FIG. 1, except that they are arranged to operate in reflection; ie the mirror layers 48 and 52 define a Fabry Perot etalon which is transmissive except for a specific wavelength which is reflected. The principles of designing mirrors and etalons to achieve this are well known in optics, and the detailed mirror construction will not be described. The light valve 40 operates as follows. A voltage $V_o$ is applied to each pixel 42. Each of the photoconductive layers 54 is in series with a respective PIN diode having parts 48, 50 and 52, and the applied voltage is arranged to reverse bias each diode. The bias voltage $V_B$ experienced by each diode is less than $V_o$ because of the voltage $V_p$ across the respective photoconductive layer in series, i.e.

$$V_B = V_o - V_p \qquad (1)$$

The light valve 40 is exposed to infra-red radiation indicated by arrow 62 from a thermal scene (not shown). Monochromatic laser light indicated by arrow 64 (to which the substrate 46 is transparent) illuminates the light valve 40 from below. Each central region 50 and its adjacent mirrors 48 and 50 are designed so that variation in bias voltage $V_B$ between two value $V_{B1}$ and $V_{B2}$ varies the reflection of the laser wavelength from a high to a low value. This corresponds to employing one side of reflectance maximum which is the inverse of that shown in FIG. 2, the light valve 40 being read out in reflection rather than transmission as before. The applied voltage $V_o$ is chosen so that the average infra red intensity falling on the light valve 40 produces a voltage drop $V_p^*$ across each photoconductive layer 54 where:

$$\tfrac{1}{2}(V_{B1} + V_{B2}) = V_o + V_p^* \qquad (2)$$

By virtue of Equation (2), the average infra-red intensity produces 50% reflection of the laser wavelength. Variation of the infra-red intensity from the average at each pixel 42 results in variation in the intensity of the reflected laser light. The reflected laser intensity rises or falls with increasing infra-red intensity according to which side of the reflectance maximum is chosen as the operating region. The result is that the spatial variation in the infra-red scene intensity is transformed into a spatial variation in laser intensity. A monochromatic light source other than a laser may be employed, but a laser beam is advantageous because its coherence permits subsequent spatial filtering.

The sensitivity of a light valve exemplified by 40 may be prearranged by appropriate choice of mirror finesse. The more sharply tuned the Fabry Perot etalon to a particular wavelength the greater will be the light valve response to divergence of infra-red intensity from the average.

The light valve 40 possesses a very important advantage for infrared imaging. A typical infra-red scene consists predominantly of background radiation upon which is superimposed a very small proportion (~0.1%) of contrast. The required image is the scene contrast information. The continual major problem is to eliminate the background radiation while retaining the contrast. Many prior art inventions have addressed this problem, one approach being sophisticated signal processing involving frame by frame signal subtraction. The light valve 40 achieves background elimination merely by setting the device operating point (50% reflection) at the average scene intensity. Furthermore, background intensity variation may be accommodated by servo-controlling the applied voltage $V_o$ so that the average bias voltage remains constant when the average infra-red intensity varies. This may be achieved by a subsidiary infra-red detector on to which radiation from the scene is focussed, the detector output signal being arranged to control $V_o$ by straightforward electronic circuitry.

The light valve 40 may be alternatively be designed so that the central region refractive index peak coincides with mirror reflection wavelength at the maximum possible value of bias voltage. This maximum value is nearly equal to $V_o$, and corresponds to photoconductive layers 54 being of negligible resistance compared to that of the central regions 50 at a high level of incident infra-red intensity. Pixels 42 experiencing less than this high infra-red intensity reflect correspondingly less laser light. Here again $V_o$ may be servo-controlled to ensure that variation in maximum pixel intensity does not change the corresponding maximum bias voltage. This mode of operation is however less advantageous for the following reason. An infra-red scene may contain small very bright regions superimposed on a background scene of moderate ambient contrast. The light valve may be operated in positive or negative contrast depending on which side of the transmission characteristic of FIG. 2 is employed, ie the reflected laser intensity may increase or decrease in intensity respectively with increasing infra-red intensity. If the latter, the operating region may be set to provide the contrast of the background scene. A change from moderately high to very high infra-red intensity then merely changes reflectance from low to lower. This avoids the problem of densensitisation to weak scene features because of the presence of strong ones.

The light valve 40 may be modified for use in other applications. By appropriate choice of material for the layers 54, it may be sensitised to any radiation for which photoconductors are available. Furthermore, the laser or read-out beam wavelength is a design option constrained only by available semiconductor materials. Using the $Al_xGa_{1-x}As$ system as wide degree of choice is available for read-out in the visible or infra-red. Applications of the light valve include image intensification, wavelength conversion and broad band to narrow band conversion in addition to infra-red imaging. The broad to narrow band conversion may for example be employed in conjunction with a monomode fibre optic communication system transmitting a single wavelength.

Referring now to FIG. 4, there is shown a schematic block diagram of a further embodiment 70 of the invention referred to as an optical transistor. The transistor 70 incorporates the modulator 10 of FIG. 1 arranged between a light emitting diode laser 72 and an avalanche photodiode detector 74. The mirrors 18 and 24 of the modulator 10 are designed to transmit the laser wavelength, and the detector 74 is preferentially sensitive to this wavelength. The modulator central region 22 is designed so that it has a refractive index peak at the laser wavelength at a reverse bias voltage or operating point $V_B$ to be discussed later.

Modulation contacts 30 and 32 are connected to respective input terminals 76. The detector 74 has two output terminals 78 via which bias is applied and output signals are extracted in a manner well known in the art.

The mode of operation of the optical transistor 70 is as follows. An input signal $V_{in}$ is applied across the modulator input terminal 76, where:

$$V_{in} = V_B + V_A(1 + \sin 2\pi ft)/2 \qquad (3)$$

where $V_A$ is the signal amplitude, f is frequency and t is time. $V_A$ is of the same polarity as $V_B$ and adds to it when the term in parentheses is non-zero. $V_{in}$ accordingly varies sinusoidally between $V_B$ and $V_A+V_B$. $V_A$ is chosen so that $V_{A+VB}$ produces a low value of transmission. The signal $V_{in}$ accordingly produces a sinusoidal variation in laser intensity reaching the detector 74, which consequently produces a sinusoidal output across terminals 78. The characteristics of the laser 72, modulator 10 and detector 74 are all design options. They may be chosen to arrange for the output signal to be greater than the input signal; ie signal and/or power amplification may be obtained.

The optical transistor 70 possesses the important advantage over conventional field effect and bipolar transistors that it is substantially free of parasitics such as input capacitance. A conventional transistor for high frequency operation has a small but finite input capacitance which short circuits the device input at a sufficiently high frequency. In comparison, the input capacitance of the optical transistor 70 is very much lower than a conventional transistor since the input contacts 30 and 32 are much more widely separated than in equivalent conventional devices. Furthermore, since the equivalent of the device current is a light beam with insignificant absorption, electrical heating of the modulator 10 during operation is not a problem. the optical transistor 70 is accordingly potentially capable of very high frequency operation to produce amplification without heating problems in at least its modulator component.

Referring now to FIG. 5, there is shown graphs 80 and 82 of Reflectance against wavelength (similar to FIG. 2) for a Fabry Perot etalon at two different central region refractive indices. The graphs 80 and 82 were calculated for an idealised etalon in which each mirror had 32 dielectric layers of alternating composition, the etalon being otherwise equivalent to the FIG. 1 device having 16 layers per mirror. The effect of increasing the number of mirror layers is to increase mirror finesse or the sharpness of the reflectance minimum or transmission maximum. Such a degree of sharpness may be employed to provide a thermal or microwave imaging device, ie a device which responds to temperature as opposed to photon absorption. The refractive index of a semiconductor varies with temperature by about 0.1% per degree K. A device similar to that shown in FIG. 1 but with 32 layers per mirror would, if constructed ideally, produce a measurable change in light transmission in response to a temperature change of 1° K. Such a device would be divided individual pixels as described earlier to provide an imager. It would respond to any radiation scene which produced a temperature change in the device. The device may be provided with a radiation absorbing surface layer for exposure to the scene, since it is not necessary for radiation to reach the device active regions so long as the radiation produces a temperature change in the device.

A further embodiment 90 of the invention is shown in FIG. 6, this being arranged as a phototransistor. The phototransistor 90 has two mirror regions 92 and 94 arranged either side of a central region 96. The mirror regions 92 and 94 are both doped n+ to provide good electrical contract to the central region 96, and are otherwise equivalent in construction to mirror regions 18 and 24 in FIG. 1. The central region 96 is a heterojunction bipolar transistor having emitter, base and collector regions 96e, 96b and 96c respectively. The emitter and collector regions 96e and 96c are of n-type $Al_{0.3}Ga_{0.7}As$, and the base region 96b is of p-type GaAs with a thickness of 100 nm. The phototransistor 90 is optically a Fabry Perot etalon formed by mirrors 92 and 94 and central region 96. The mirror reflectance and central region thickness are chosen for selective transmission or reflection at a wavelength λ corresponding to a photon energy $E_λ$ intermediate that of the bandgaps of the base and collector or emitter region materials. i.e.

$$E_b < E_λ < E_e \text{ or } E_c \quad (4)$$

where
  $E_b$=base material band gap (GaAs) and
  $E_e/E_c$=emitter/collector material band gap ($Al_{0.3}Ga_{0.7}As$)

The central region 96 constitutes a heterojunction bipolar transistor of a kind known in the art of semiconductor devices. The base 96b thickness and doping are arranged for high speed operation. The base thickness may be less than the 100 nm value given above. The emitter and collector regions 96e and 96c are transparent to the photon energy $E_λ$, but this photon energy is absorbed by the base region 96. The phototransistor 90 is biased in the conventional way by making collector 96c positive with respect to emitter 96e. This may be achieved via contacts (not shown) to mirrors 92 and 94.

Unlike earlier embodiments, the phototransistor 90 operates by absorption of light. The function of the mirrors 92 and 94 is to provide for light to be detected to pass many times through the base region 96b. This amplifies the optical absorption path length, and increases the probability of photon absorption. At the same time, the electrical design of the active central region 96 is largely unconstrained by optical requirements. The electrical design may be optimised for high speed operation for example, and any corresponding reduction in optical performance compensated by increasing mirror finesse and consequent number of optical transits through the central region 96. The phototransistor 90 is potentially capable of very high speed operation, whereas conventional phototransistors are only suitable for low frequencies.

A Fabry-Perot etalon produced from a multilayer heterostructure of semiconductor materials, i.e., prepared using materials of the $InP/In_xGa_{1-x}As$ system, is illustrated schematically in FIG. 7. Etalon 100 comprises two mirrors 102 and 104 each containing plural semiconductor layers arranged in $InPIn_xGa_{1-x}As$ layer pairs. For illustrated clarity, only four layers are shown for each mirror, the presence of other layers being indicated by discontinuities such as 106. Mirrors 102 and 104 are arranged face to face, i.e., have opposed periodicity, and contain therebetween a central cavity region 108 comprising InP.

The process for producing the etalon 10 employed the reagents trimethyl indium, trimethyl gallium, arsine and phosphine. Unlike earlier embodiments, semiconductor layer dopants were not employed. Moreover, the etalon 10 was designed for a transmission wavelength much longer than the absorption edge wavelength of the InP central region 108. The purpose of this approach was to investigate the viability and properties of a semiconductor multilayer Fabry Perot etalon without the additional complexities introduced by electronic properties and optical absorption. It should be noted that it is very well known in MOCVD to introduce semiconductor layer dopants by admixture of appropriate vapours. Moreover, adjusting the thickness of central region 108 appropriately for its semiconductor band gap presents no difficulty. Demonstrating the viability of the etalon 10 accordingly validates structures such as that shown in FIG. 1.

Referring now to FIG. 8, there are shown two graphs 120 and 122 of reflectance (arbitrary units) against wavelength in microns (nm × 10³). The graphs 120 and 122 are relatively displaced in the vertical direction, and are referred to ordinate axes to the right and left respectively. The upper graph 120 is a theoretically calculated reflectance variation based on the nominal layer thicknesses previously given together with published values of refractive index. The lower graph 122 was experimentally measured using the etalon 100. The graphs 120 and 122 are in very good agreement. A theoretical best fit to the experimental graph 122 indicated that even better agreement could be obtained by assuming that the mirror layers were 4% greater than nominal thickness, and that the central region was 8% greater than nominal thickness.

The experimental graph 122 has a central reflectance minimum (transmission maximum) 124 at 1880 nm, about 4% higher than the design value of 1800 nm. It represents a reduction from near 100% reflectance at nearby minima 126 and 128 to 21% at 124. THese reflectance values include the effect of the InP substrate (not shown in FIG. 7) on which the etalon 10 was grown. If the substrate were to have been removed, the minimum reflectance would have fallen further to nearly 0%, i.e. nearly 100% transmission. The minimum 124 has a full width at half maximum (FWHM) of 13.5 nm which is a 0.7% of the centre wavelength of 1880 nm.

FIGS. 7 and 8 demonstrate that a high quality Fabry Perot etalon may be grown as a semiconductor multilayer structure by well-known technology. Moreover, the layers may be doped by addition of dopant species to produce a biasable device by known MOCVD means.

I claim:

1. In an electro-optical device comprising a Fabry-Perot etalon having a central region of electro-optic material between two mirrors of multilayer construction, and electrical biasing means, connected to the mirrors, for applying a variable bias to the mirrors to vary the refractive index of the central region and thereby the etalon fringe maximum wavelength, the improvement wherein:
   (1) the central region and the mirrors are a heterostructure of successively deposited layers of semiconductor materials,
   (2) the mirrors are doped to have mutually opposite conductivity type and the central region has lower doping than the mirrors to provide a PIN diode structure in which bias voltage applied by the biasing means appears predominantly across the central region,
   (3) the etalon has an interference fringe maximum in the vicinity of a central region optical absorption wavelength associated with electric field dependent refractive index, and
   (4) the biasing means is arranged to reverse bias the PIN diode structure.

2. A device according to claim 1, wherein each mirror comprises alternately arranged layers of two semiconductor materials.

3. A device according to claim 2, wherein the mirror layers are of $Al_xGa_{1-x}As$ where the value of the compositional parameter x alternates between two values.

4. A device according to claim 3, wherein the two values of x are 1.0 and 0.3.

5. A device according to claim 2, wherein the central region comprises at least one quantum well.

6. A device according to claim 5, wherein the central region is formed of two semiconductor materials of the $Al_xGa_{1-x}As$ system where the value of the compositional parameter X alternates between two values.

7. A device according to claim 2, wherein the central region comprises quantum wells of one semiconductor material arranged alternately with barrier layers of a second semiconductor material.

8. A device according to claim 1 including optical and electrical isolating means extending through the central region and at least one mirror, and divided thereby into an array of pixels.

9. A device according to claim 8, wherein each of said pixels is surmounted by and in series with a respective photoconductive layer, the device providing a light value for radiation incident on the photoconductive layers.

10. A device according to claim 9, including biasing means arranged to vary device bias in accordance with average radiation intensity such that the device is selectively responsive to scene contrast.

11. A device according to claim 8, including a respective layer of radiation absorbing material surmounting and in contact with each of said pixels to provide thermal imaging properties.

12. In an electro-optical device comprising a Fabry-Perot etalon having a central region of electro-optic material between two mirrors of multilayer construction, and electrical biasing means, connected to the mirrors, for applying a variable bias to the mirrors to vary the central region refractive index and thereby the etalon fringe maximum wavelength, the improvement wherein:
   (1) the central region and the mirrors are a heterostructure of successively deposited layers of semiconductor materials,
   (2) the mirrors are doped to have like conductivity type,
   (3) the central region comprises a heterojunction bipolar transistor having emitter and collector regions of conductivity type equivalent to that of the mirrors but relatively lower doping such that bias voltage applied by the biasing means appears predominantly across the central region,
   (4) the transistor has a base region formed of a semiconductor material having opposite conductivity type to and lower energy gap than the emitter and collector regions,
   (5) the base region is absorbing at an etalon interference fringe maximum wavelength but the emitter and collector regions are transport at this wavelength, and
   (6) the biasing means is arranged to bias the central region to produce phototransistor operation

* * * * *